(12) United States Patent
Sasaki

(10) Patent No.: US 9,235,255 B2
(45) Date of Patent: Jan. 12, 2016

(54) SEMICONDUCTOR INTEGRATED CIRCUIT AND INFORMATION PROCESSING APPARATUS

(71) Applicant: CANON KABUSHIKI KAISHA, Tokyo (JP)

(72) Inventor: Mitsuru Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 13/909,995

(22) Filed: Jun. 4, 2013

(65) Prior Publication Data

US 2013/0332758 A1    Dec. 12, 2013

(30) Foreign Application Priority Data

Jun. 7, 2012   (JP) .................................. 2012-129885

(51) Int. Cl.
  *G06F 1/32*  (2006.01)
  *G06F 1/24*  (2006.01)

(52) U.S. Cl.
  CPC  *G06F 1/324* (2013.01); *G06F 1/24* (2013.01); *G06F 1/3237* (2013.01); *G06F 1/3287* (2013.01); *Y02B 60/1221* (2013.01); *Y02B 60/1282* (2013.01)

(58) Field of Classification Search
  CPC ... G06F 1/3202; G06F 1/3237; G06F 1/3243; G06F 1/3296; Y02B 60/32; Y02B 60/1221; Y02B 60/1239
  USPC .......................................................... 713/300
  See application file for complete search history.

(56) References Cited

U.S. PATENT DOCUMENTS

| | | | | |
|---|---|---|---|---|
| 5,801,561 A * | 9/1998 | Wong et al. | .................... | 327/143 |
| 6,198,319 B1 * | 3/2001 | Hara | .............. | 327/143 |
| 2004/0199799 A1 * | 10/2004 | Flynn | ........... | 713/300 |
| 2005/0144492 A1 * | 6/2005 | Yun et al. | ....... | 713/300 |
| 2007/0008789 A1 * | 1/2007 | Kwak | ....... | 365/189.05 |
| 2007/0208963 A1 * | 9/2007 | Shinto | ......... | 713/500 |
| 2008/0065920 A1 * | 3/2008 | Suginaka et al. | ............. | 713/324 |
| 2010/0174933 A1 * | 7/2010 | Lu et al. | ......... | 713/324 |
| 2011/0221483 A1 * | 9/2011 | Liu et al. | ....... | 327/142 |

FOREIGN PATENT DOCUMENTS

JP     2002-312073 A     10/2002

* cited by examiner

*Primary Examiner* — Vincent Tran
(74) *Attorney, Agent, or Firm* — Canon USA, Inc. IP Division

(57) ABSTRACT

In a semiconductor integrated circuit having a power domain and a mechanism for a power supply shutoff, when a power supply to the power domain is started, if a clock for an initialization operation is supplied in a state where a voltage to the power domain is unstable, power consumption during the initialization operation increases. Thus, the clock for the initialization operation of the power domain is supplied after detecting that the voltage supplied to the power domain is stabilized.

9 Claims, 22 Drawing Sheets

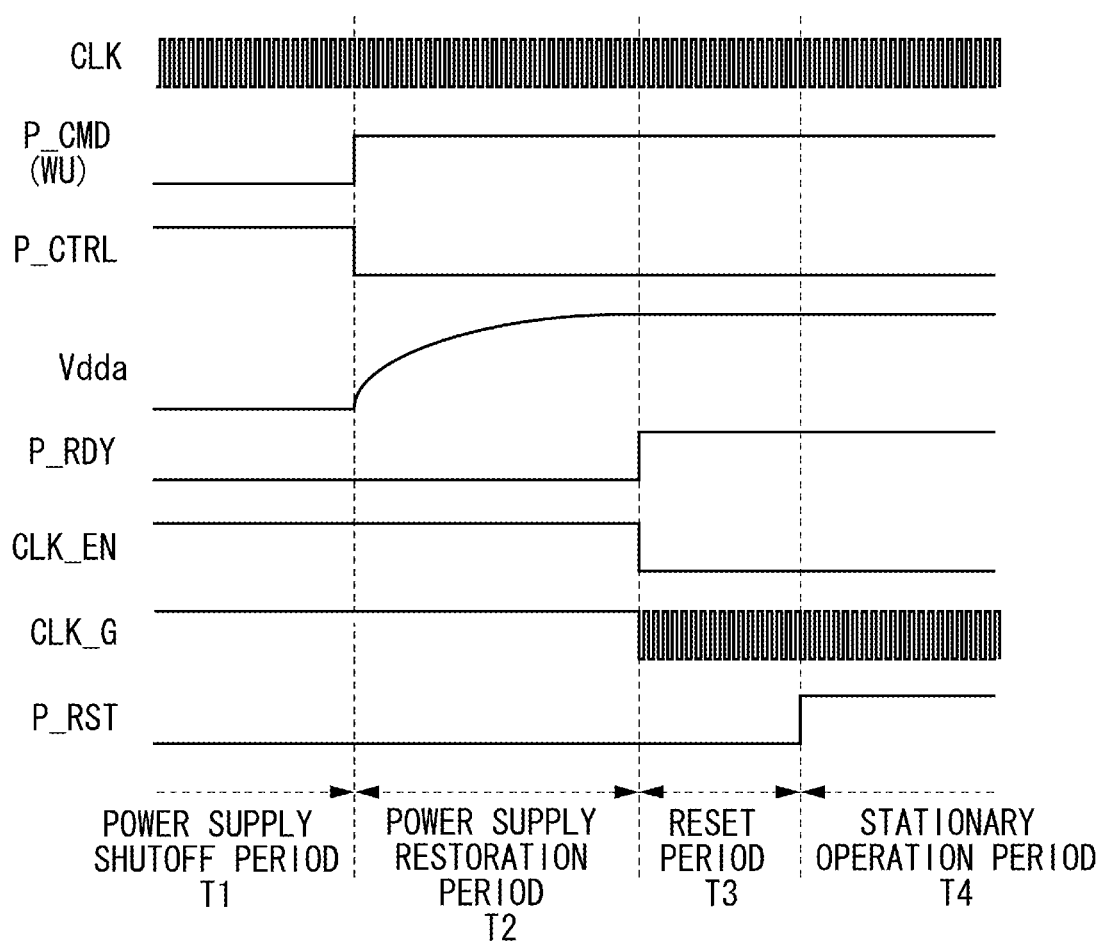

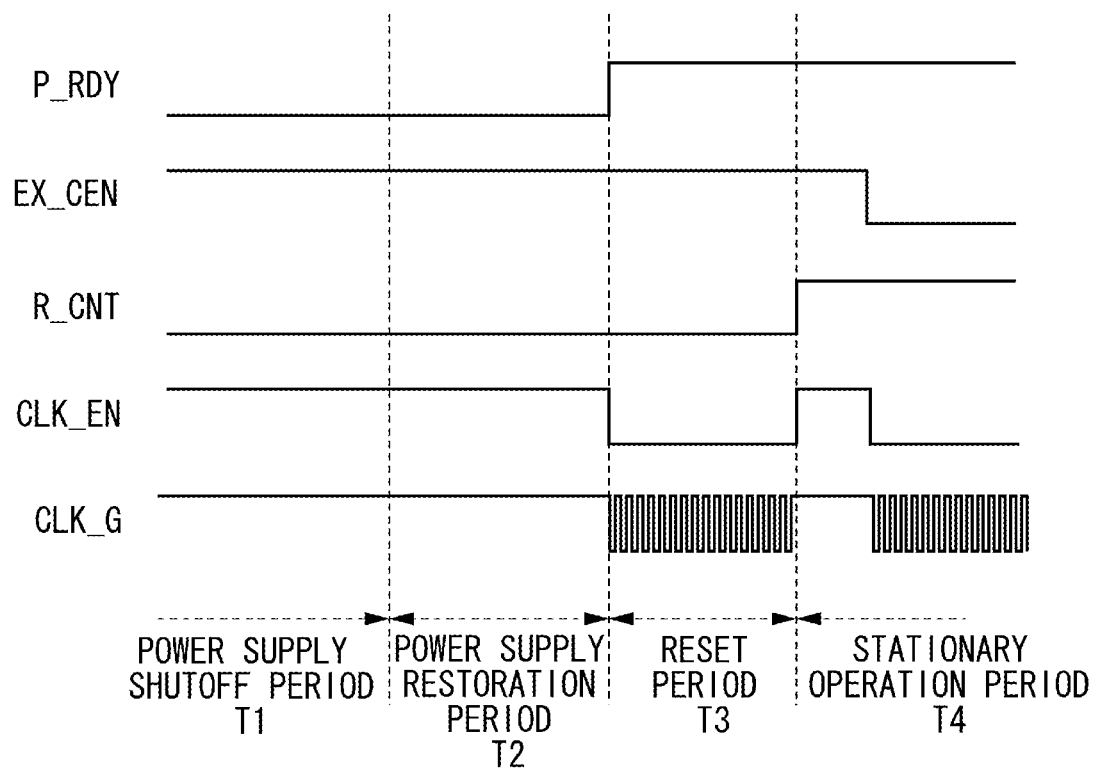

SEMICONDUCTOR INTEGRATED CIRCUIT AND INFORMATION PROCESSING APPARATUS

BACKGROUND OF THE INVENTION

1. Field of the Invention

The present invention relates to techniques to restore a power supply control target unit (power domain) within a semiconductor integrated circuit from a power supply shutoff state.

2. Description of the Related Art

The recent trend toward energy savings for environmental considerations has led to an increased demand for reduced power consumption in semiconductor integrated circuits. For example, to reduce power consumption, a power supply to part of sub-systems (power supply control target unit) in a semiconductor integrated circuit may be temporarily shut off while the functions of the sub-systems are not being used.

When a sub-system to which the power supply has been shut off is to be restored, the sub-system needs to be initialized after the power is supplied thereto and thus is initialized before entering normal operations. Japanese Patent Application Laid-Open No. 2002-312073 discusses a technique to restore a power supply from a state where the power supply is shut off and a reset signal (RS) is active, the supply of power and a clock is started (restarted) simultaneously. Here, a reset time corresponding to an operation clock frequency is set in advance in a counter, and after the power and the clock start being supplied, the set reset time is timed. Then, the reset signal is canceled to return to the normal operation state.

During an initialization operation, a state is initialized by causing a signal change in a storage element such as a flip-flop inside a sub-system, and thus the circuit needs to be operated in a state where clocks are supplied to the entire sub-system during the initialization operation. Accordingly, power consumption during the initialization operation (restoration period in Japanese Patent Application Laid-Open No. 2002-312073) is often greater than that during normal operations. Here, it is important to supply clocks in a state where a power supply voltage to the sub-system is stable during the initialization operation. However, if a clock is supplied in a state where the voltage is unstable as in Japanese Patent Application Laid-Open No. 2002-312073, power consumption increases.

In addition, time required for the power supply voltage to stabilize after the power supply starts varies depending on such factors as the scale (size, shape, position, number of pieces, number of gates, process types) of a power supply control target portion, to which the power supply is to start, and the conditions of other power supply control targets. However, with a method discussed in Japanese Patent Application Laid-Open No. 2002-312073, the reset time is set based on the operation clock frequency before a clock starts being supplied to the sub-system, and thus the reset time needs to be set long in consideration of the aforementioned factors, and it is hard to reduce power consumption.

SUMMARY OF THE INVENTION

According to an aspect of the present invention, a semiconductor integrated circuit includes a power supply control target unit, wherein a power supply supplied thereto is to be controlled, a power supply control unit configured to control the power supply supplied to the power supply control target unit, a detection unit configured to detect that a voltage of the power supply supplied to the power supply control target unit by the power supply control unit has reached a specified voltage for operating the power supply control target unit, and an initialization unit configured to control so that a clock supply to the power supply control target unit starts based on a detection of the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a timing chart of the semiconductor integrated circuit including the reset circuit.

FIG. 10B is a timing chart where the external clock enable is enabled after the internal reset.

DESCRIPTION OF THE EMBODIMENTS

Various exemplary embodiments, features, and aspects of the invention will be described in detail below with reference to the drawings.

First, an overview of an exemplary embodiment of the invention, through which power consumption during an initialization operation is reduced, will be described.

Figure 1:
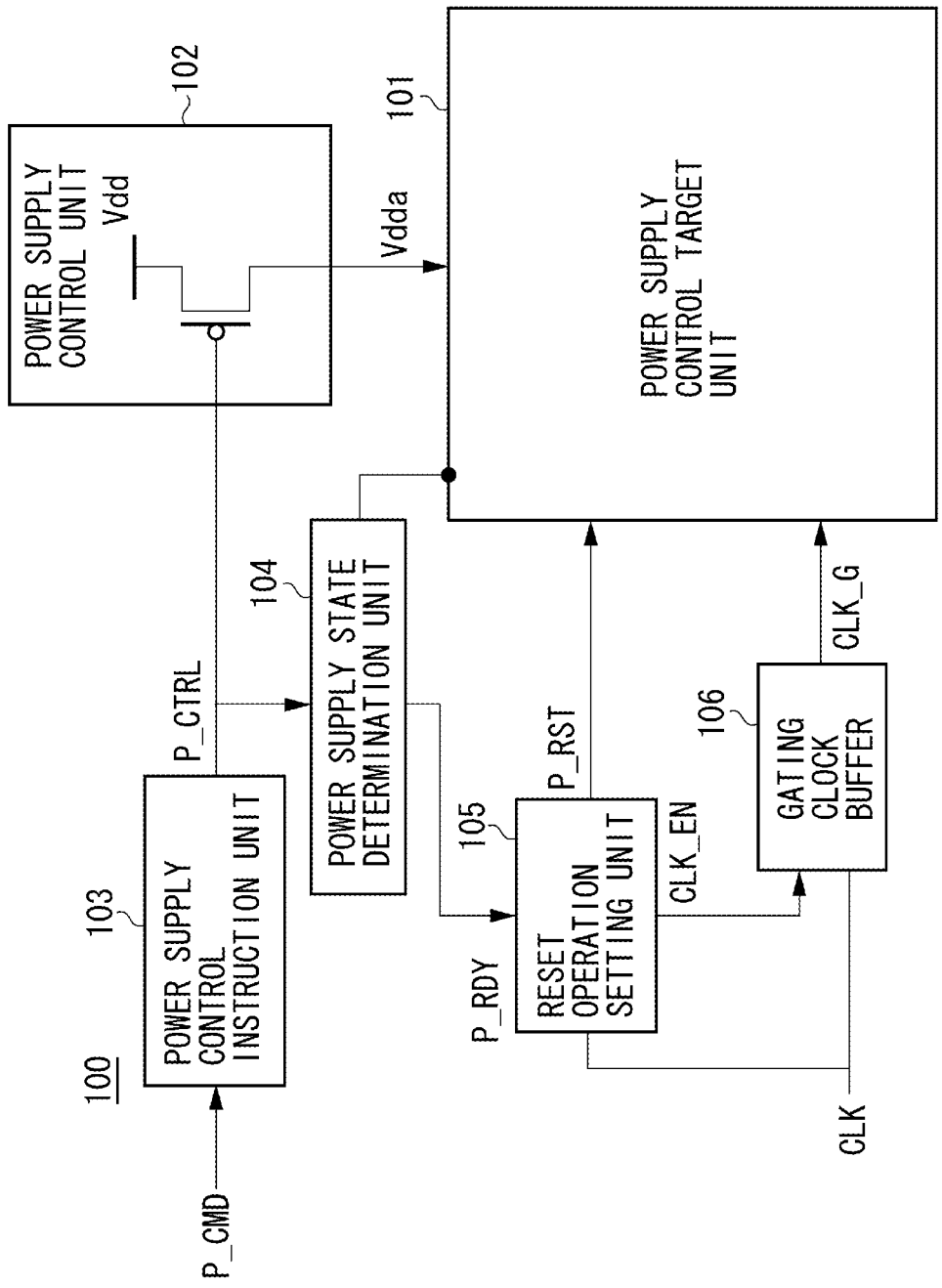
FIG. 1 is a block diagram schematically illustrating an internal configuration of a semiconductor integrated circuit including a reset circuit.

FIG. 1 is a block diagram illustrating a schematic of a power supply control target unit 101 of a semiconductor integrated circuit 100 and a reset configuration thereof according to the present exemplary embodiment of the invention. The power supply control target unit 101 is often called a power domain or a voltage domain. A power domain refers to a region on an integrated circuit a power supply to which can be stopped through an identical (or a plurality of combinations of) power control element(s) (e.g., a P-channel metal oxide semiconductor (PMOS) switch, a field-effect transistor (FET)). A power domain serves to suppress a leakage current on a chip. A power domain may be a circuit block, a function module, an integrated circuit, a sub-system, or the like that satisfies the aforementioned definition. A single power domain may include a plurality of functional modules and/or sub-systems.

In FIG. 1, a power supply Vdda, which serves as a power supply voltage to be input to the power supply control target unit 101, is connected to a power supply Vdd via a power supply control unit 102 such as a power supply switch. A power supply control instruction unit 103 issues an operation instruction (indicated as P_CTRL) to operate the power supply control unit 102, based on an power supply control instruction (indicated as P_CMD) issued in response to an external power supply switch being operated through an application program or by a user.

A power supply state determination unit 104 detects the state of the power supply Vdda of the power supply control target unit 101. If the power supply Vdda is at a power supply voltage where the power supply control target unit 101 can stably operate, the power supply state determination unit 104 transmits to a reset operation setting unit 105 a power ready signal (indicated as P RDY) indicating to that effect. In response to receiving an active power ready signal, the reset operation setting unit 105 sends to a gating clock buffer 106 a clock enable signal (indicated as CLKEN) to cancel gating. In addition to sending the clock enable signal, the reset operation setting unit 105 sends to the power supply control target unit 101 a reset signal (indicated as P_RST) only for a set period of time to carry out an initialization operation.

In this specification, an initialization operation refers to an operation in which the power supply control target unit 101, to which a stable power supply voltage is being supplied, continues being supplied with a clock (indicated as CLK_G) and an active reset signal (P_RST), to initialize the power supply control target unit 101.

Although a power supply switch configured of a PMOS is used in the power supply control unit 102 of FIG. 1, any power supply switches configured to control the power supply voltage such as a complementary switch including a N-channel metal oxide semiconductor (NMOS) and a PMOS can be employed in the present invention. Further, although the gating clock buffer 106 of FIG. 1 has a configuration to negate a clock propagation through an OR operation, an AND operation may be employed instead. In the description to follow, for the sake of simplicity, a PMOS and an OR operation will be employed.

An arrow indicated in FIG. 1 that is directed from the power supply control unit 102 to the power supply control target unit 101 indicates a supply path of the power supply Vdda. A line with a round terminal indicated in FIG. 1 that is directed from the power supply state determination unit 104 to the power supply control target unit 101 indicates a sensing terminal in a case where the power supply state determination unit 104 is configured of a measurement device to sense the power supply state. The power supply state determination unit 104 and the reset operation setting unit 105 will be described later in detail.

FIG. 2 is a timing chart, when a power supply is to be restored, of various signals pertaining to a reset configuration of the semiconductor integrated circuit 100 according to the present exemplary embodiment.

Specifically, FIG. 2 illustrates a state that sequentially transfers to a power supply shutoff period T1 in which a power supply to the power supply control target unit 101 is suspended, a power supply restoration period T2 in which power is supplied, a reset period T3 in which an initialization operation is carried out after detecting that the power supply is stabilized, and a stationary operation period T4.

CLK indicates a system clock supplied to the semiconductor integrated circuit 100. The system clock CLK may be generated by a clock generator within the semiconductor integrated circuit 100.

Signals P_CMD, P_CTRL, Vdda, P_RDY, CLK_EN, CLK_G, and P_RST correspond to the respective signals indicated in FIG. 1. Although digital signals are indicated as being low active (negative polarity) in the chart in FIG. 2, the present invention can be applied even when the digital signals are positive polarity as long as the signals accord with a logic circuit.

In the present exemplary embodiment, even when a power supply control instruction (P_CMD) is activated to transition into the power supply restoration period T2, the reset operation setting unit 105 does not activate the clock enable signal (CLK_EN) until P_RDY serving as a notification of the power supply voltage Vdda being stabilized is activated. The reset operation setting unit 105 of this embodiment activates CLK_EN with the power supply state determination unit 104 activating a power ready signal (P_RDY) as a trigger to carry out an initialization operation for a preset period (the number of cycles).

Hereinafter, various components in the present exemplary embodiment will be described in detail.
Power Supply State Determination Units Each of FIGS. 3A, 3B, and 3C illustrates in detail a power supply state determination unit 104 of the present exemplary embodiment.

Figure 3A:
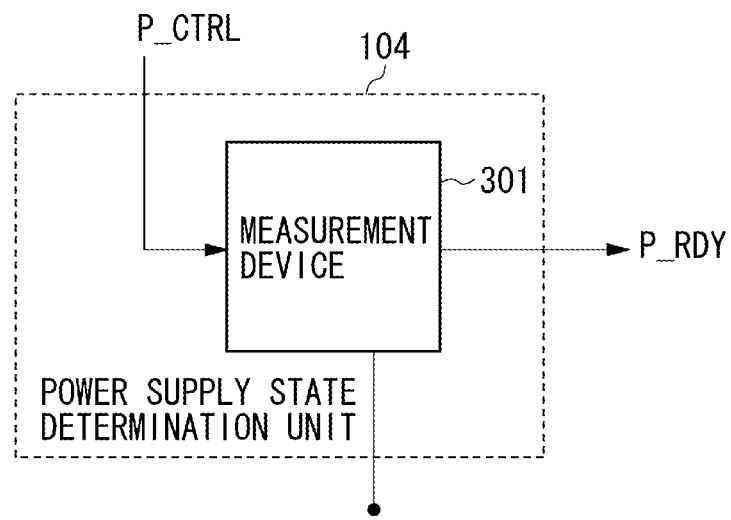
FIG. 3A is a block diagram illustrating a configuration of a power supply state determination unit through power supply state measurement.

FIG. 3A illustrates a configuration to directly sense the voltage state of the power supply control target unit 101. Specifically, as a measurement device 301 that measures the power supply voltage in response to an operation instruction (P_CTRL) being input thereto detects that Vdda has reached the specified voltage at which the power supply control target unit 101 stably operates, a power supply restoration timing of the power supply control target unit 101 can be accurately detected. A line with a round terminal indicated in each of FIGS. 3A and 3C that is directed to the outside of the power supply state determination unit 104 indicates a terminal to sense the state of the power supply Vdda of the power supply control target unit 101. Here, the measurement device 301 may measure another physical quantity that varies with a voltage such as a current or a voltage comparison to detect that the power supply Vdda is stabilized, or may sense the power supply voltage using a changing point of a signal of a complementary metal oxide semiconductor (CMOS) transistor. Furthermore, the operation instruction does not need to serve as a trigger to start the measurement, and the measurement may be started by an instruction from a central processing unit (CPU) or the like (not shown).

Figure 3B:
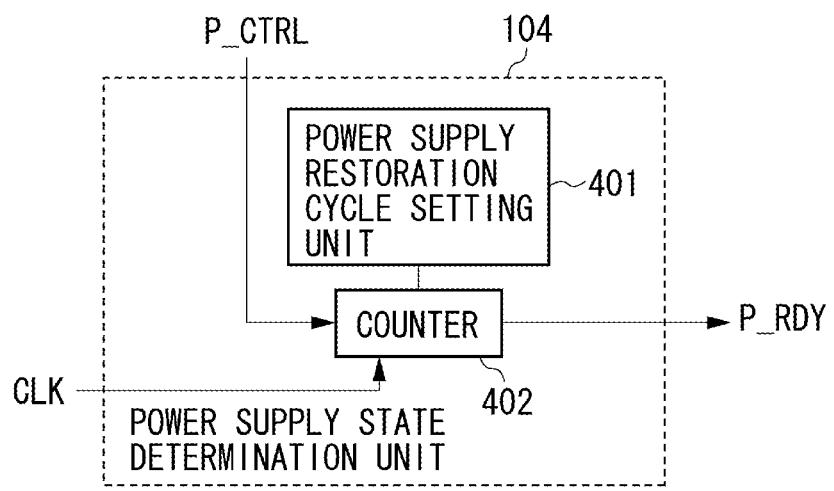
FIG. 3B is a block diagram illustrating a configuration of a power supply state determination unit through power supply state prediction.

FIG. 3B illustrates a configuration in which a period from the start of the power supply until the specified voltage is reached is known in advance and counting this period enables to detect that the voltage state is in a stably operable state. FIG. 3B illustrates the configuration of a power supply state determination unit 104 that includes a power supply restoration cycle setting unit 401 and a counter 402. The power supply restoration cycle setting unit 401 sets to the counter 402 a value (e.g., the number of cycles) corresponding to a period required for the power supply to be restored received from a CPU or the like (not shown). The counter 402 counts the set power supply restoration period in response to the input of an operation instruction (P_CTRL). Here, the configuration of the power supply restoration cycle setting unit 401 is not limited to the register setting by the CPU and may hold a fixed value in advance or load settings from a memory or the like.

Figure 3C:
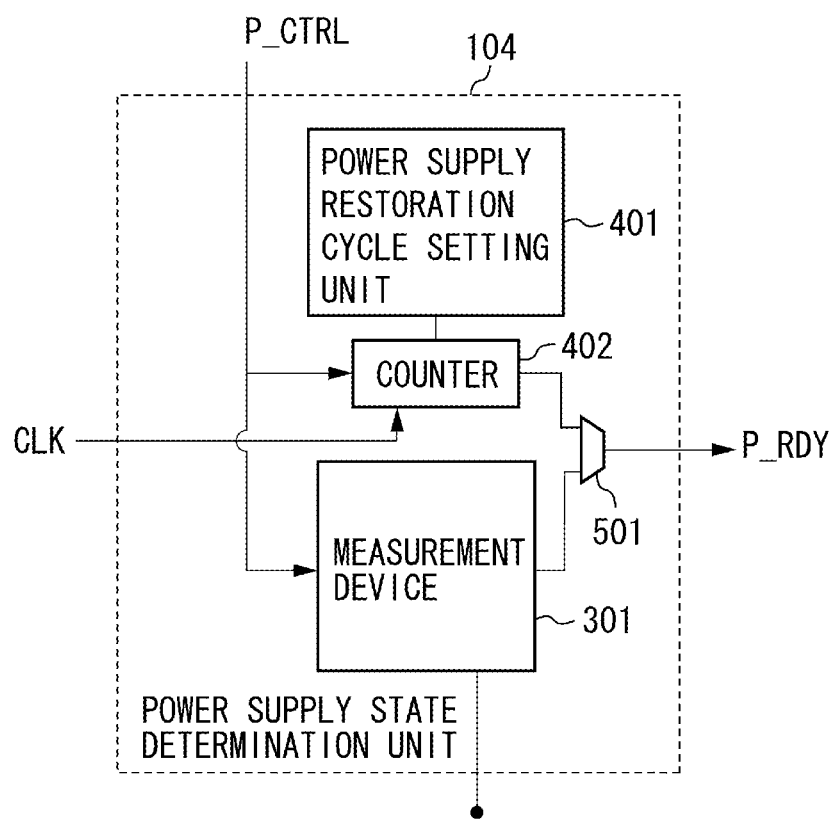
FIG. 3C is a block diagram illustrating a configuration of a power supply state determination unit that selectively uses the power supply state prediction and the power supply state measurement.

FIG. 3C illustrates a power supply state determination unit 104 capable of selectively operating in between the configuration of FIG. 3A and the configuration of FIG. 3B. A selector 501 is further provided to switch between the two configurations in accordance with an input from a register (not shown) and/or an external input. For example, normally, the state of Vdda is measured with the measurement device 301, and if a fluctuation of Vdda becomes unacceptable, the selector 501 may be used to switch to the configuration including the counter 402.

Reset Operation Setting Unit

Figure 4A:
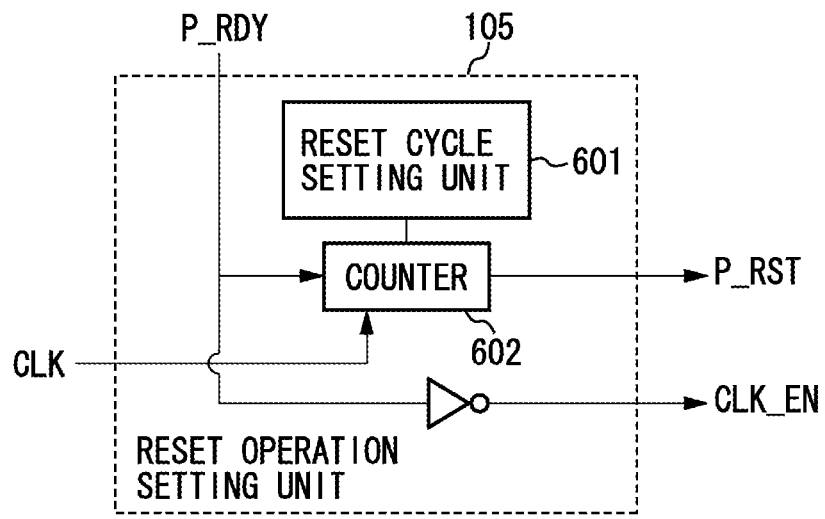
FIG. 4A is a block diagram illustrating a schematic configuration of a reset operation setting unit.
Figure 4B:
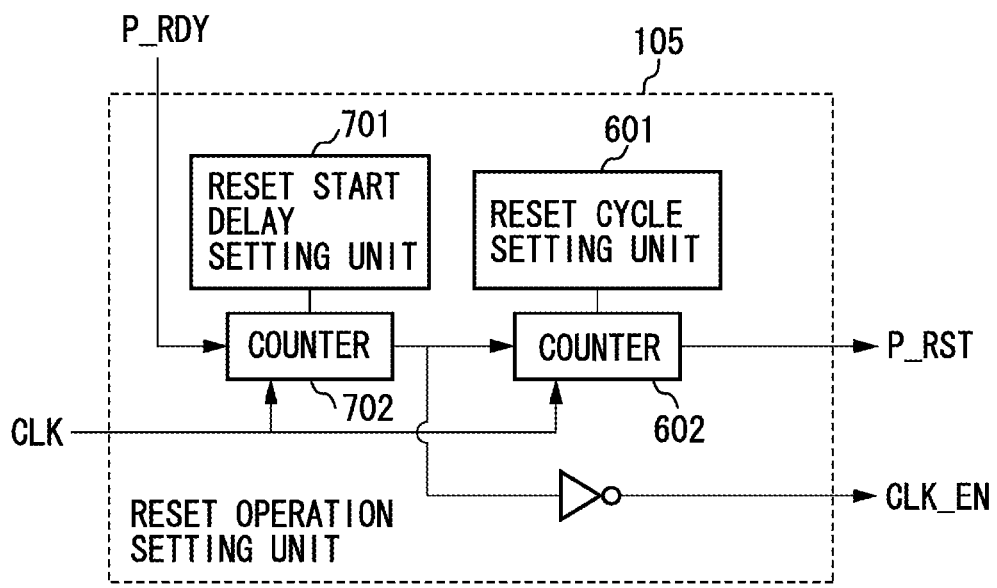
FIG. 4B is a block diagram illustrating a configuration of a reset operation setting unit including a delay mechanism for a reset start time.
Figure 4C:
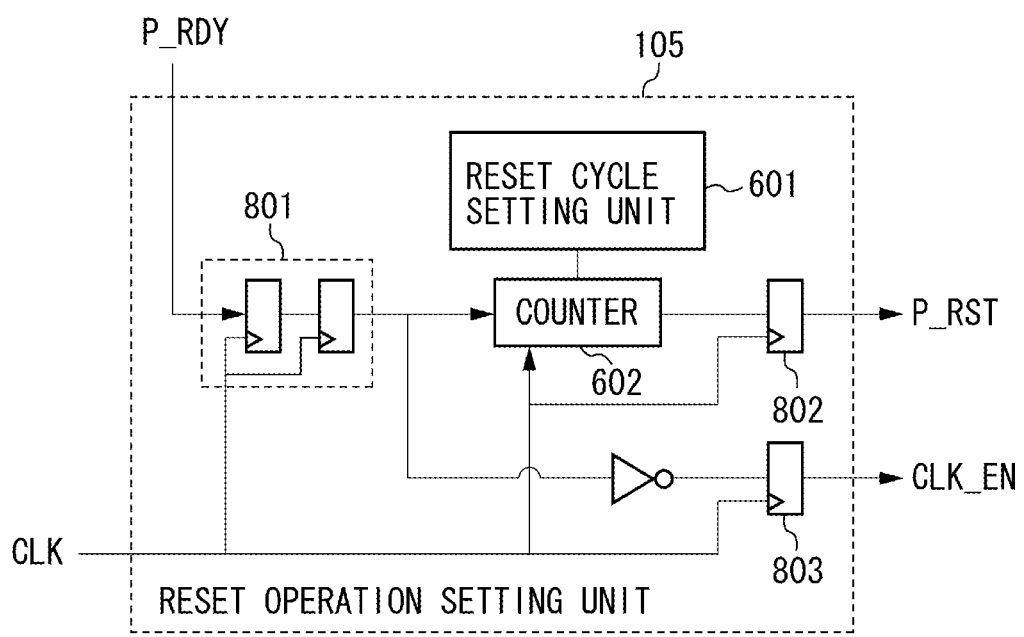
FIG. 4C is a block diagram illustrating a configuration of a reset operation setting unit including a synchronization mechanism for a signal control target.

Each of FIGS. 4A to 4C illustrates in detail a reset operation setting unit 105 of the present exemplary embodiment. FIG. 4A illustrates a reset operation setting unit 105 that includes a reset cycle setting unit 601 and a counter 602. The reset cycle setting unit 601 sets the number of cycles required for the reset. The counter 602 starts operating with a power ready signal (P_RDY) from the power supply state determination unit 104 as a trigger. As the counter 602 starts counting (timing), the reset operation setting unit 105 starts outputting a clock enable signal (CLK_EN). Then, as the counter 602 stops counting, the reset operation setting unit 105 stops transmitting a reset signal (P_RST). Here, the reset cycle setting unit 601 may hold a fixed value in advance, hold a count value through the register setting by a CPU (not shown), or load a count value from a memory or the like.

FIG. 4B illustrates a reset operation setting unit 105 in which a counter 702 to delay a clock enable signal and/or a reset signal is added to the configuration of FIG. 4A. With this configuration, in response to an input of a power ready signal, the counter 702 counts only for a period (value, the number of cycles) set by a reset start delay setting unit 701 in advance, and while the counter 702 is counting, the propagation of the power ready signal is put on standby. When the counter 702 finishes counting for the set period, the reset operation setting unit 105 starts outputting a clock enable signal (CLK_EN) and propagates the power ready signal to the counter 602. Configurations and functions in stages thereafter are the same as the configurations and the functions of FIG. 4A, and thus the descriptions thereof will be omitted.

In FIG. 4C, a signal synchronization circuit 801 is added to operate the reset operation setting unit 105 being further synchronized with the power supply control target unit 101. For example, in a case where the power supply state determination unit 104 measures the state of the power supply Vdda as in FIG. 3A or 3C, the power ready signal is not necessarily input to the reset circuit in synchronization. In addition, it may be difficult to design the power supply state determination unit 104 and the reset operation setting unit 105 to be in synchronization with each other at the time of deciding on the layout of the semiconductor integrated circuit 100. Note that, similarly for an output signal (reset signal, clock enable signal) from the reset operation setting unit 105, flip-flops are arranged as synchronization signal output circuits 802 and 803, respectively.

Effects of the present exemplary embodiment can be obtained if any one of the power supply state determination units 104 of FIGS. 3A to 3C is combined with any one of the reset operation setting units 105 of FIGS. 4A to 4C.

Thus, as indicated in the timing chart of FIG. 2, the initialization operation starts after the power supply voltage is stabilized in the present exemplary embodiment. Accordingly, the initialization operation can be carried out more efficiently and power consumption can be reduced as compared to the technique discussed in Japanese Patent Application Laid-Open No. 2002-312073.

In another exemplary embodiment, a configuration in which a power supply control configuration is extended to a semiconductor integrated circuit 900 that includes N (N is an integer equal to or greater than 2) semiconductor integrated circuits 100 (hereinafter, referred to as sub-modules) is described.

Figure 5:
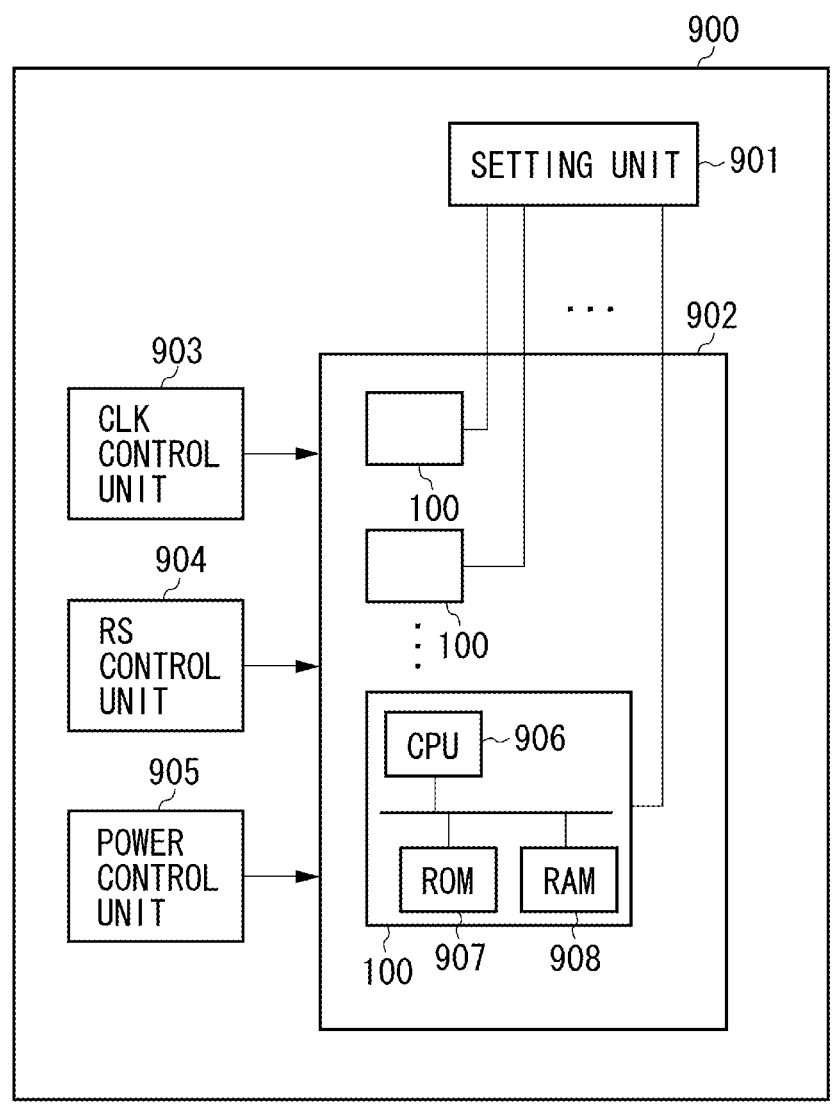
FIG. 5 is a block diagram illustrating a configuration of a reset circuit for a plurality of power supply control target units.

FIG. 5 illustrates a schematic configuration of the semiconductor integrated circuit 900 having N sub-modules 100 described above as the semiconductor integrated circuits 100. A CLK control unit 903 individually controls clocks to be supplied to the respective sub-modules. An RS control unit 904 individually controls reset signals to be supplied to the respective sub-modules. A power control unit 905 individually outputs power supply control instructions to the respective sub-modules. In this embodiment, although the power supply control instructions (P-CMD) for the respective sub-modules centrally controlled by the power control unit 905 are transmitted to the power supply control instructions 103 of the respective sub-modules, the configuration may be implemented as a single block having functions of the power control unit 905 and the power supply control instruction units 103 of the respective sub-modules. In this case, the block having the functions of the power control unit 905 and the power supply control instruction units 103 of the respective sub-modules directly transmits an operation instruction (P_CTRL) to the power supply control unit 102 and the power supply state determination unit 104.

Although at least one of the sub-modules includes a CPU 906, a ROM 907, and a RAM 908 in the configuration illustrated in FIG. 5, the CPU 906, the ROM 907, and the RAM 908 may be assigned to the sub-modules. A setting unit 901 sets a parameter pertaining to power supply restoration to various counters and a power supply restoration cycle setting unit 401 included in each sub-module.

Figure 6:
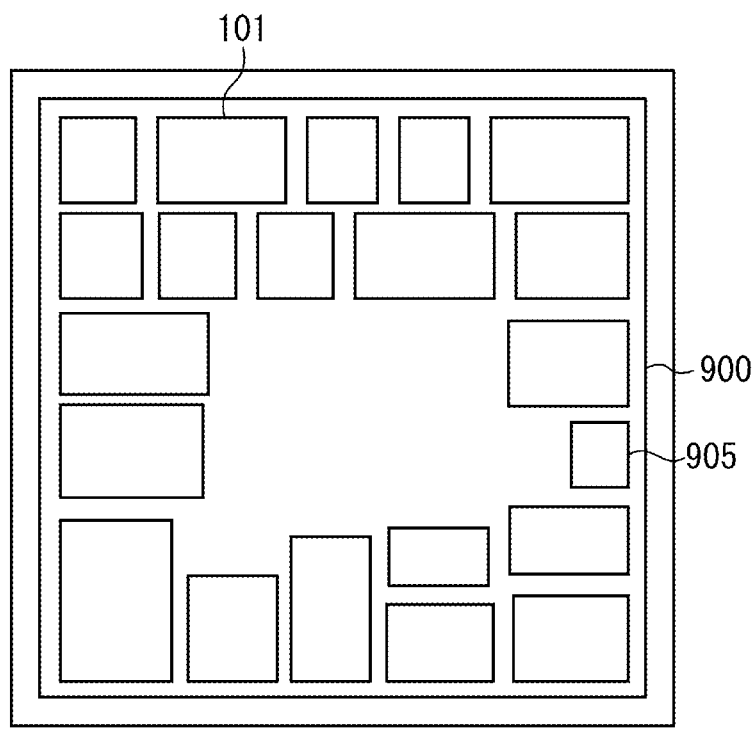
FIG. 6 is a schematic diagram illustrating a floor plan of the reset circuit for the plurality of power supply control target units.

FIG. 6 illustrates a schematic of a floor plan of the semiconductor integrated circuit 900 illustrated in FIG. 5, in which 20 power supply control target units 101 and the power supply control instruction 905 are arranged. As illustrated in FIG. 6, the size and the arrangement vary among the power supply control target units 101. In FIG. 6, the reset operation setting unit 105, the power supply state determination unit 104, and the gating clock buffer 106 are omitted. In the preset exemplary embodiment, when the power supply to the power supply control target unit 101 is controlled, the power supply control target unit 101 is surrounded by a plurality of power switches, and thus the power supply control unit 102 is arranged to follow along a frame surrounding the power supply control target unit 101. Further, in the exemplary embodiment, power supply control regions are basically configured not to overlap with one another on the integrated circuit.

Figure 7A:
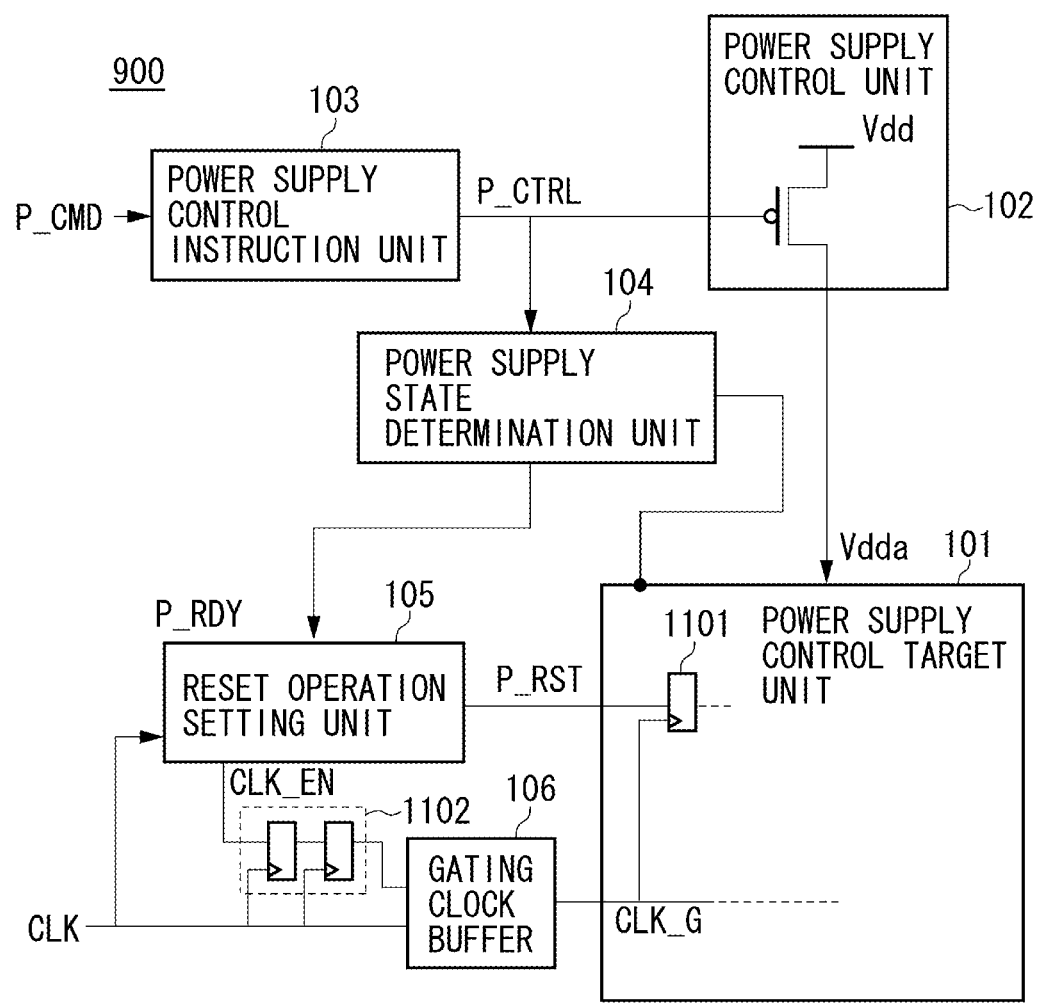
FIG. 7A is a block diagram illustrating a configuration to synchronize clock enable signals of a plurality of power supply control target units.
Figure 7B:
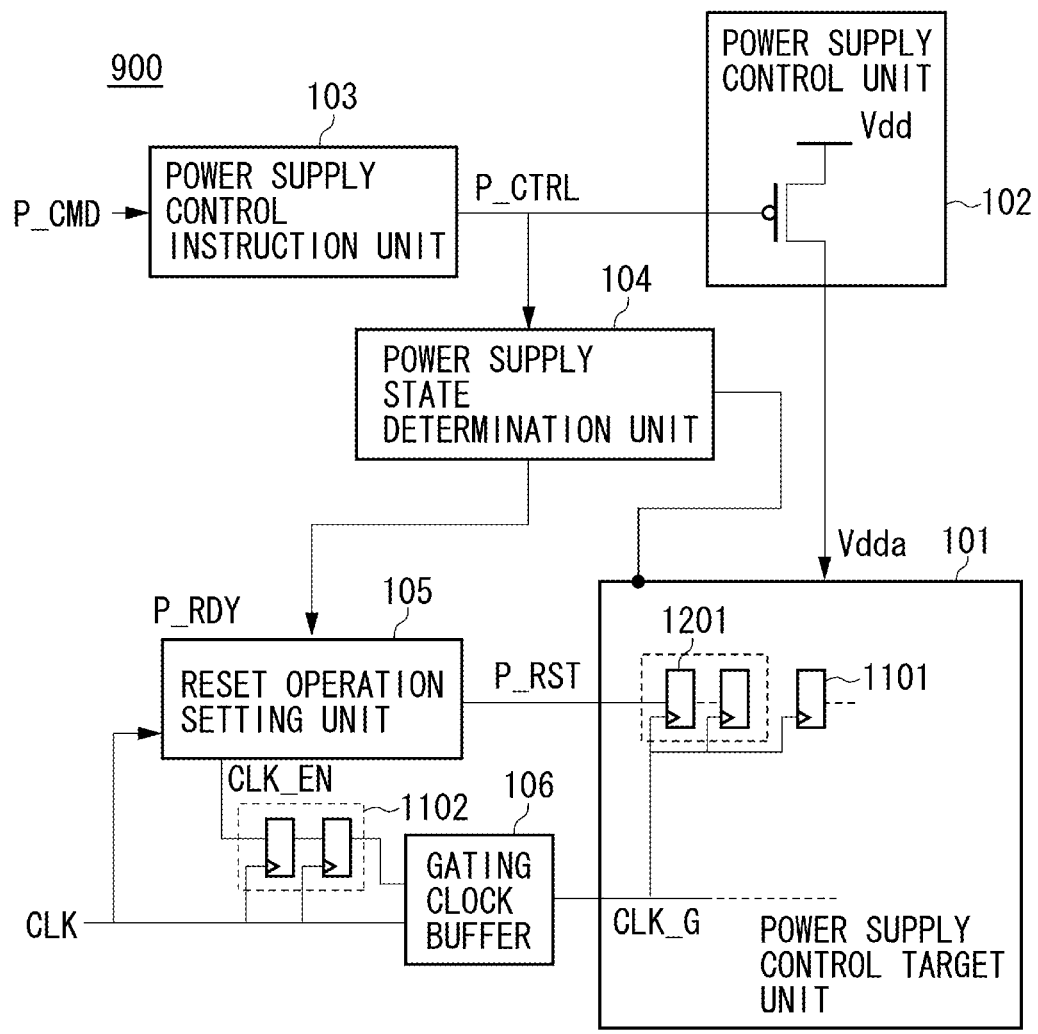
FIG. 7B is a block diagram illustrating a configuration to synchronize reset signals of a plurality of power supply control target units.

Here, with the configuration of FIG. 6, it is expected that it may be difficult to synchronize the power supply control instruction unit 103, the power supply state determination unit 104, and/or the reset operation setting unit 105 with the power supply control target unit 101 and/or the gating clock buffer 106. To counter such a case, as illustrated in FIG. 7A and 7B, a synchronization mechanism may be provided in the power supply control target unit 101 and/or the gating clock buffer 106. In the configuration illustrated in FIG. 7A, a signal synchronization circuit 1102 is provided in a preceding stage of the gating clock buffer 106, and thus synchronization of a clock enable signal (CLK_EN) and the reset operation setting unit 105 can be improved. Here, a relay register 1101 distributes a reset signal (P_RST) within the power supply control target unit 101. In the configuration illustrated in FIG. 7B, the relay register 1101 is provided to distribute the reset signal within the power supply control target unit 101, and a signal synchronization circuit 1201 is provided in a preceding stage of the relay register 1101.

As described thus far, a plurality of power supply control configurations can be suitably controlled with the present exemplary embodiment.

Subsequently, a configuration extended to allow both a power domain control and a clock domain control (power-saving control through clock shutoff) to be achieved will be described. A clock domain control refers to a method for saving power in which a clock is shut off to reduce a dynamic current.

Figure 8:
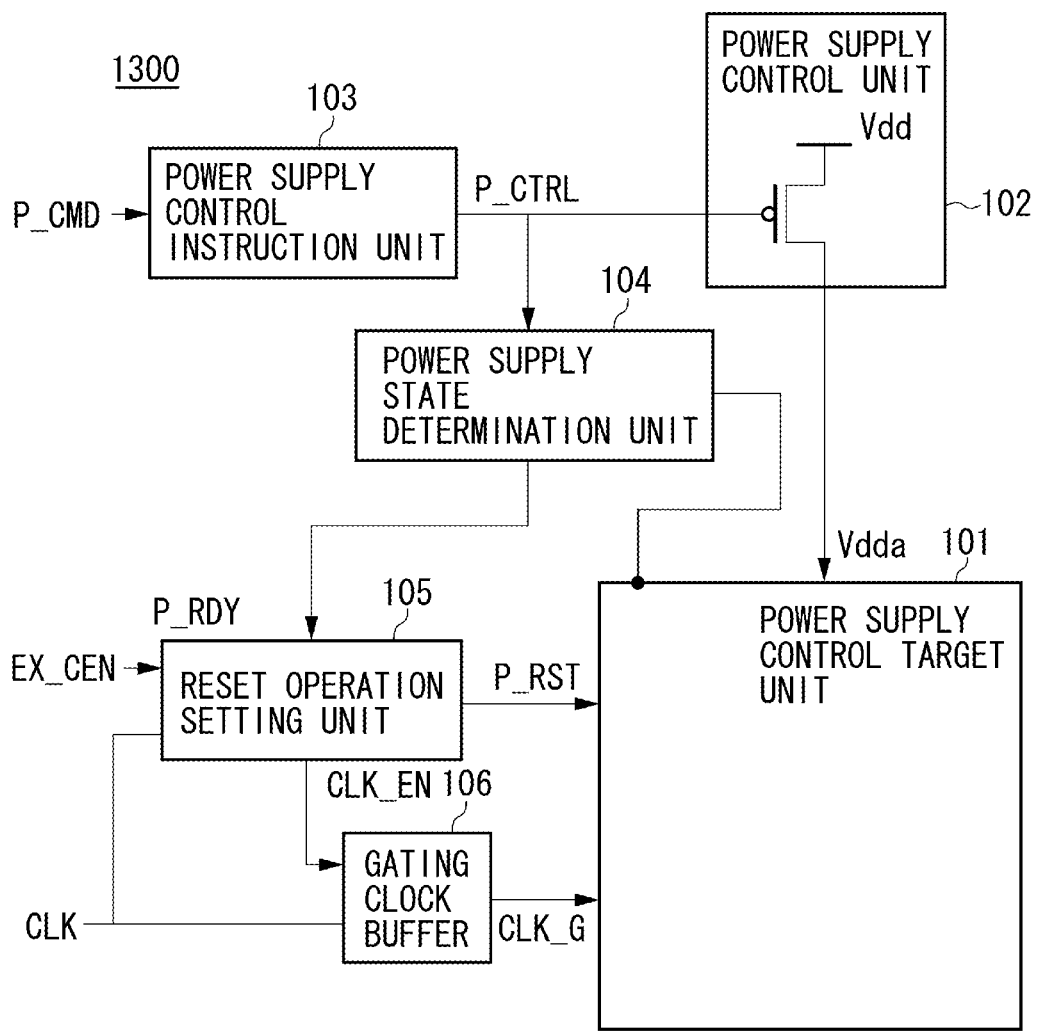
FIG. 8 is a block diagram illustrating a configuration of a reset circuit with an external input of the clock enable signal.

FIG. 8 illustrates a configuration in which a second clock enable signal (indicated as EX_CEN) for the clock domain control is input to the reset operation setting unit 105 to enable the clock domain control. In the description of this embodiment, CLK_EN represents a first clock enable signal. The second clock enable signal switches between presence or absence of shutoff of a clock supply to the power supply control target unit 101 in an operating state, and the configuration should be such that the second clock enable signal does not affect a clock supply to the power supply control target unit 101 during an initialization operation.

Figure 9:
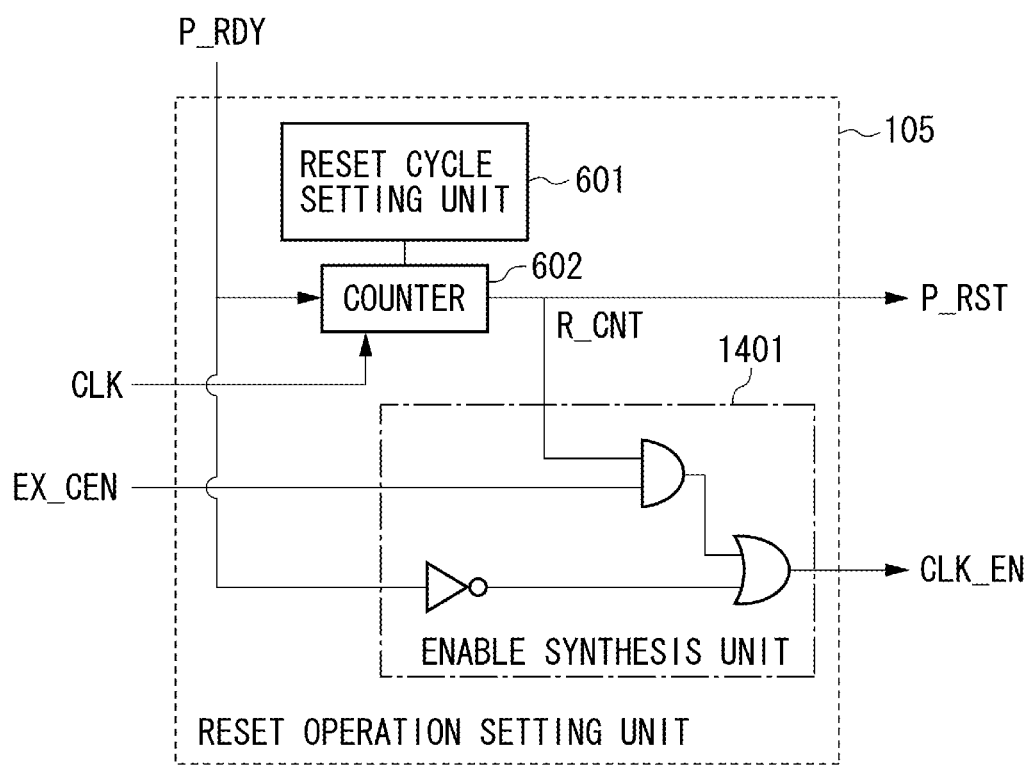
FIG. 9 is a block diagram illustrating a configuration of a reset operation setting unit with an external input of the clock enable signal.

FIG. 9 is a block diagram illustrating the configuration of the reset operation setting unit 105 of the present embodiment. In the configuration of FIG. 9, an enable synthesis unit 1401 is additionally provided to synthesize the second clock enable signal for not affecting the clock supply control for the initialization operation and to output the first clock enable signal. The counter 602 supplies an internal signal (R_CNT) to the enable synthesis unit 1401. This configuration allows a power-saving control to be efficiently carried out by shutting off a clock to the power supply control target unit 101 in an operating state in a power domain while a clock supply for an initialization operation is not shut off.

Figure 10A:
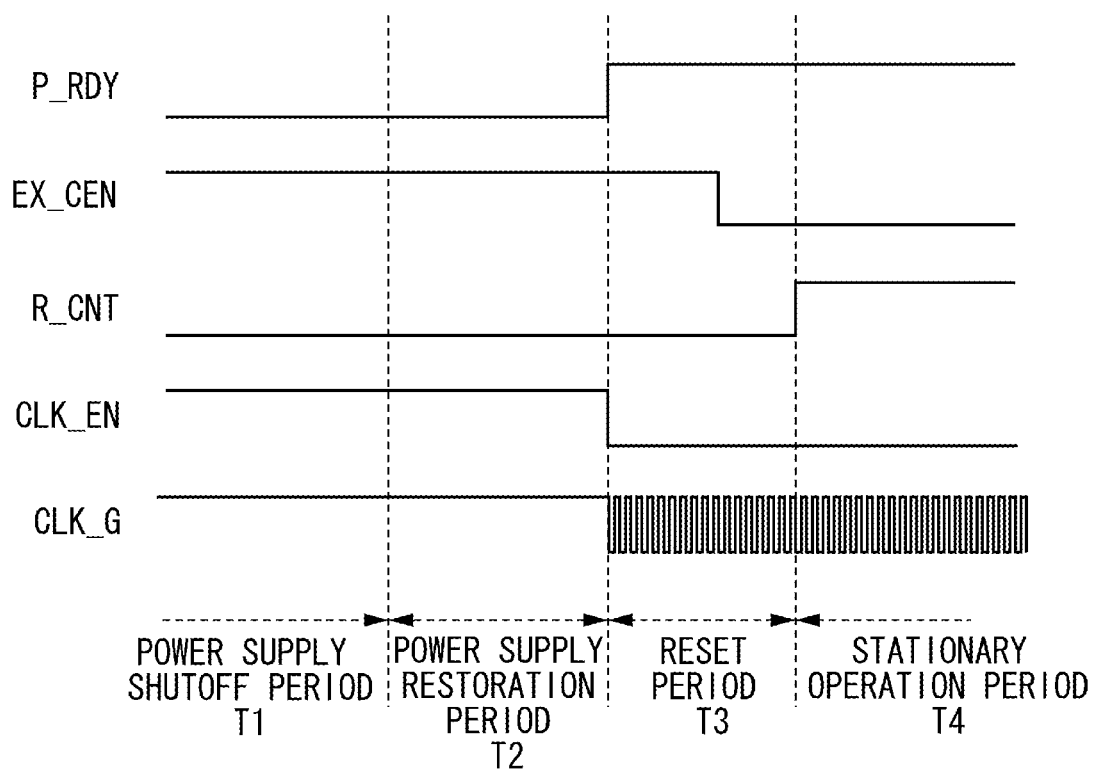
FIG. 10A is a timing chart where an external clock enable is enabled prior to an internal reset.

FIGS. 10A and 10B illustrate timing charts of various signals (EX_CEN and CLK_EN are negative polarity) pertaining to the reset operation setting unit 105 illustrated in FIG. 9.

FIG. 10A illustrates a case where a second clock enable signal (EX_CEN) input to the reset operation setting unit 105 during a reset period T3 after power supply restoration is activated. As illustrated in FIG. 10A, a clock is supplied to the power supply control target unit 101 only for a period in which the first clock enable signal (CLK_EN) for the initialization operation associated with power supply restoration is set in the configuration of FIG. 9. Accordingly, the power supply control target unit 101 can immediately take on normal operations after the reset period T3 ends.

FIG. 10B illustrates a case where a second clock enable signal (EX_CEN) is activated after the reset period T3 ends following power supply restoration. In other words, as illustrated in FIG. 10B, at any time after the reset period T3 ends, a clock to the power supply control target unit 101 can be immediately suspended through the second clock enable signal to achieve power-savings.

As described thus far, with the present exemplary embodiment, the clock domain control can be carried out not to affect the initialization operation of the power supply control target unit 101 to reduce power consumption. That is, the present embodiment allows both the power domain control and the clock domain control to be efficiently achieved.

Subsequently, a configuration extended to achieve both the power domain control and a reset control will be described.

Figure 11A:
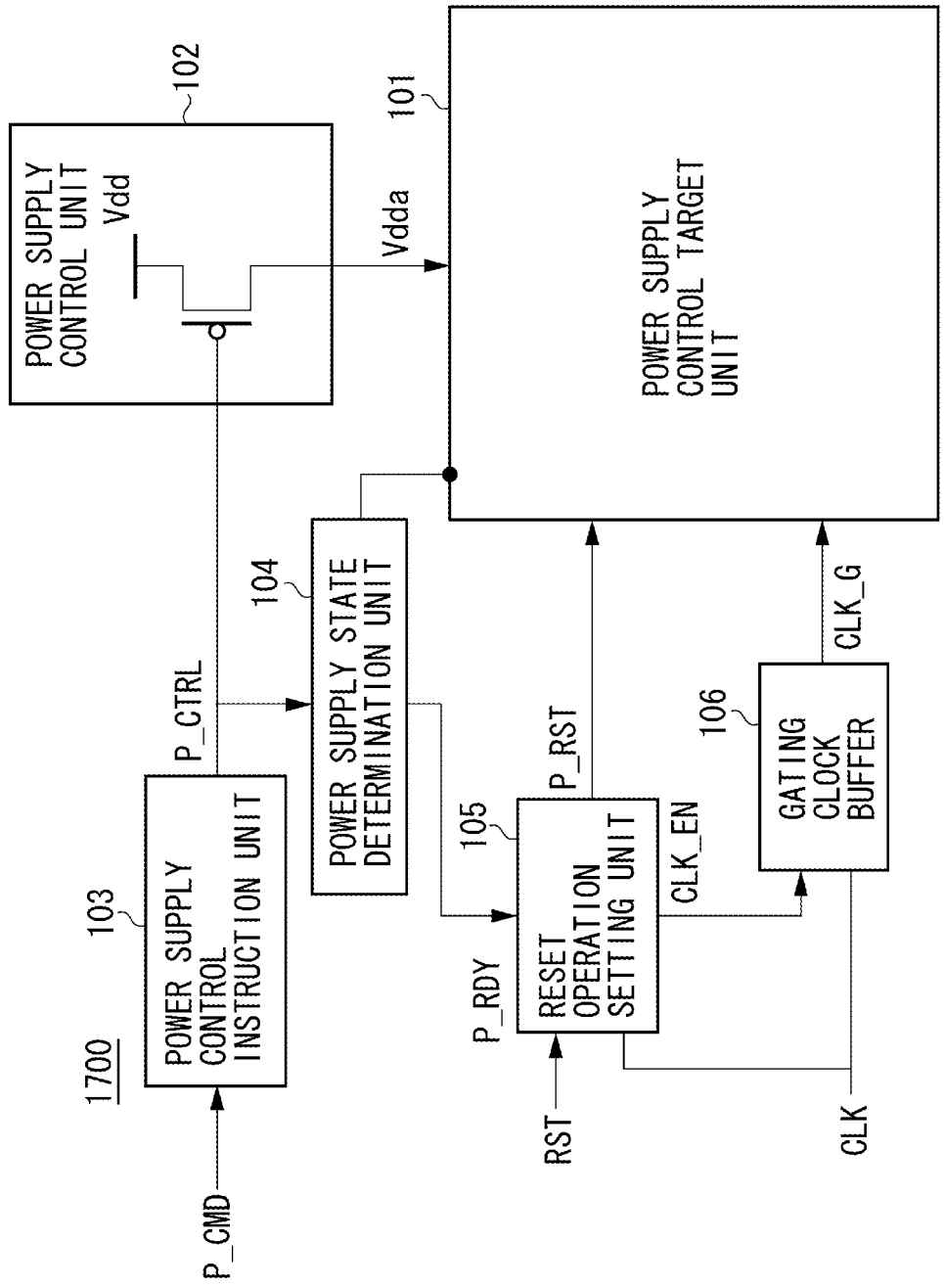
FIG. 11A is a block diagram illustrating a configuration of a reset circuit with an external input of a reset signal.

FIG. 11A illustrates a configuration in which a reset signal is externally input to a reset operation setting unit 105. In FIG. 11A, the reset operation setting unit 105 carries out a reset operation based on an external reset signal (RST), which is an externally-input reset signal, in addition to a power ready signal from the power supply state determination unit 104. Here, the external reset signal is for controlling resetting of the power supply control target unit 101, and the configuration should be such that the external reset signal does not affect the supply of the reset signal to the power supply control target unit 101 for the initialization operation when the power supply is restored.

Figure 11B:
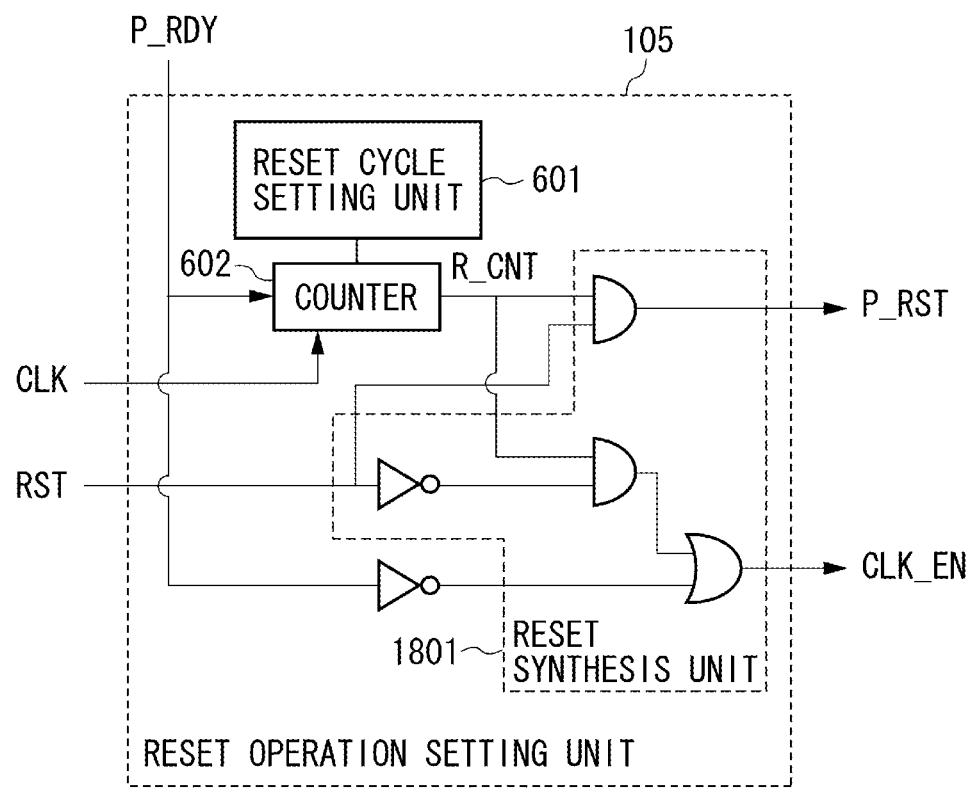
FIG. 11B is a block diagram illustrating a configuration of a reset operation setting unit with the external input of the reset signal.

FIG. 11B is a block diagram illustrating the configuration of the reset operation setting unit 105. In the configuration illustrated in FIG. 11B, a reset synthesis unit 1801 is additionally provided in the reset operation setting unit 105 of FIG. 4A to synthesize the external reset signal for not affecting a supply control of the reset signal for the initialization operation and to output the first clock enable signal.

Figure 12A:
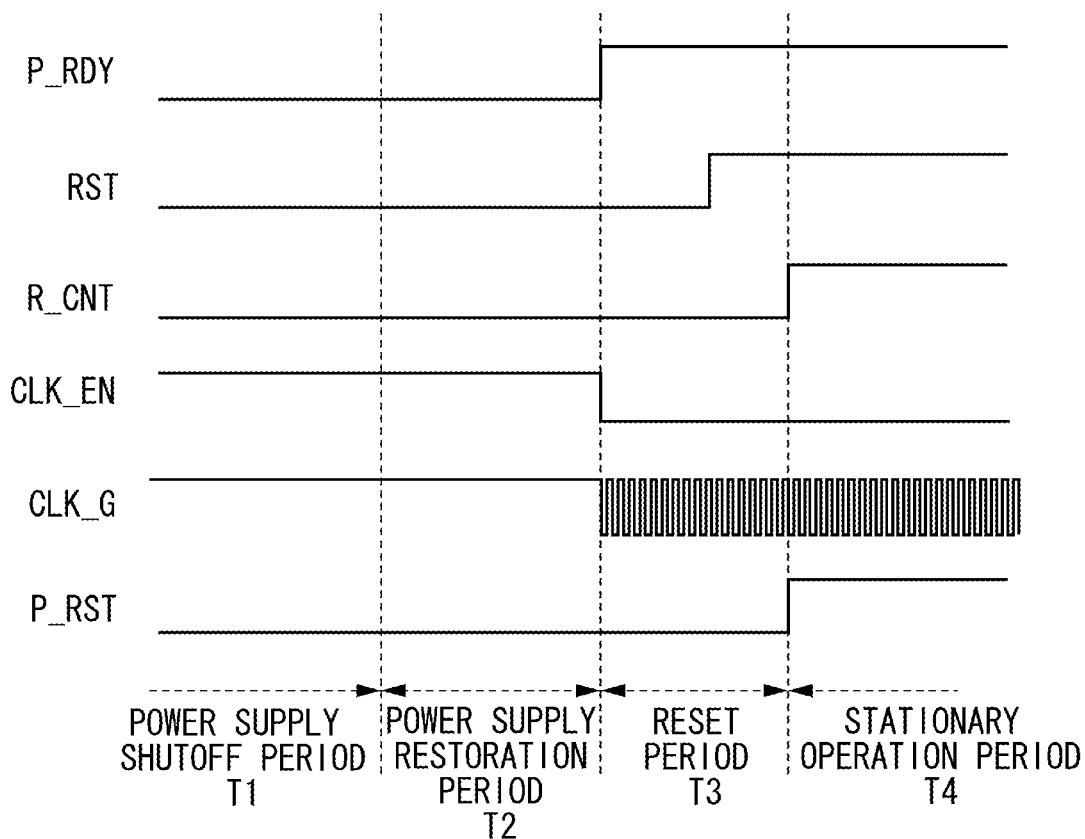
FIG. 12A is a timing chart where an external reset is canceled prior to an internal reset.
Figure 12B:
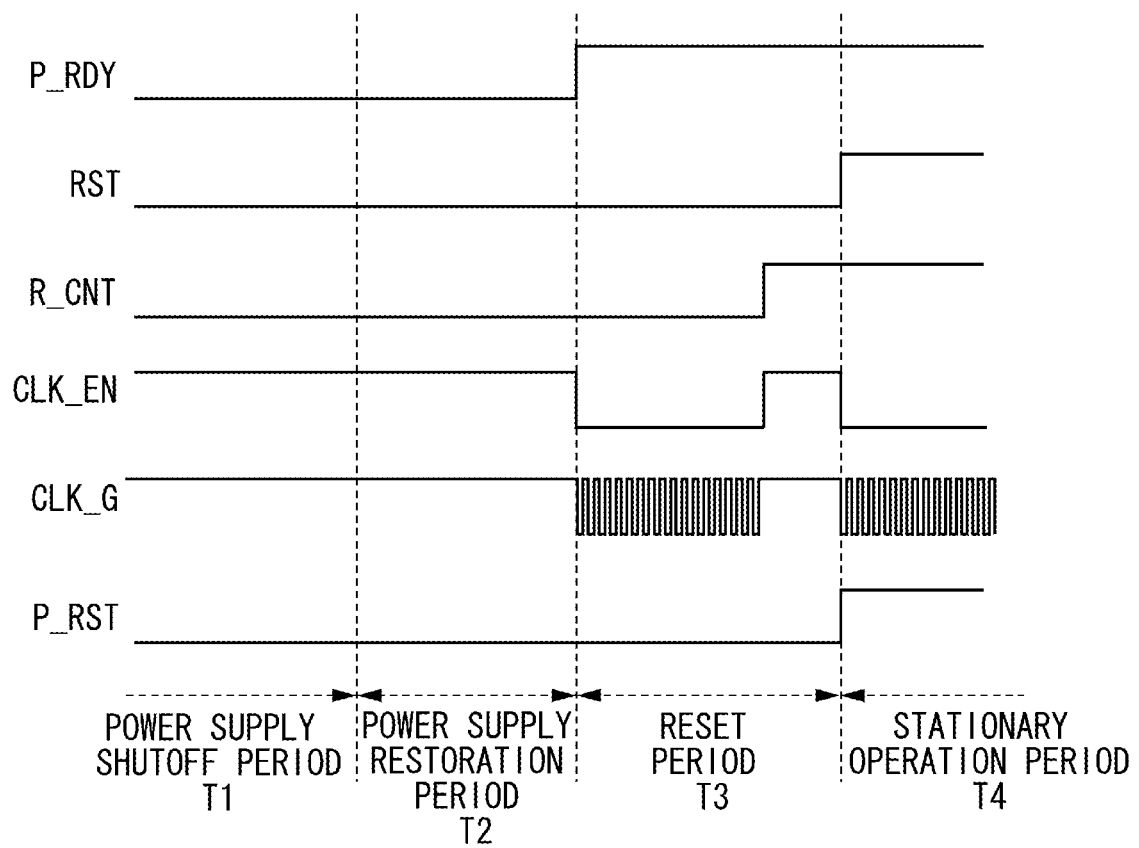
FIG. 12B is a timing chart where the external reset is canceled after the internal reset.

FIGS. 12A and 12B illustrate timing charts of various signals (RST, CLK_EN, and P_RST are negative polarity) pertaining to the reset operation setting unit 105 illustrated in FIG. 11B. In the timing charts of FIGS. 12A and 12B, the second clock enable signal (EX_CEN) of FIGS. 10A and 10B is inverted to result in an external reset signal (RST), and thus detailed descriptions thereof will be omitted.

As described thus far, both the power domain control and the reset control that is not related to the power domain control can efficiently be achieved.

Subsequently, a configuration extended to include a reset propagation mechanism in the power supply control target unit 101 will be described.

Figure 13:
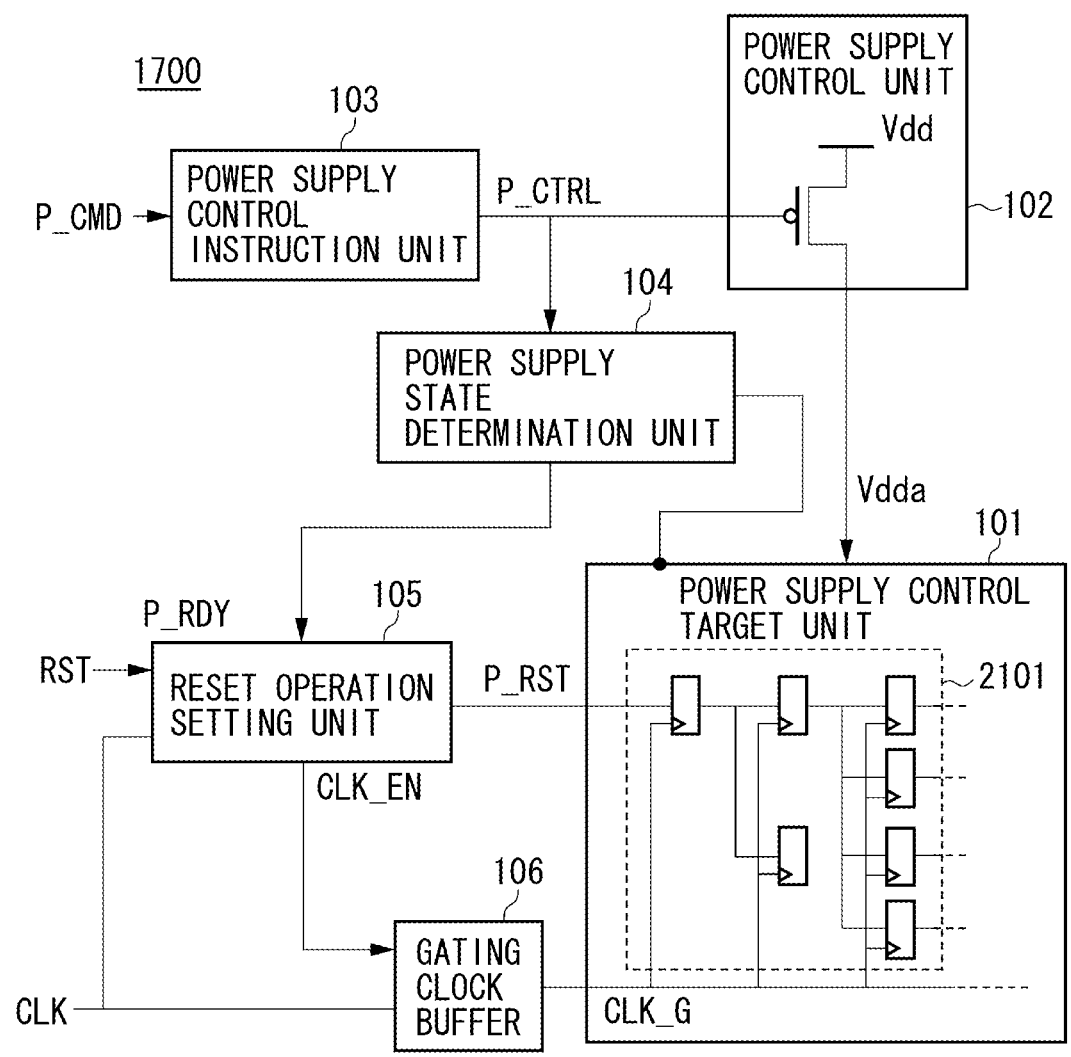
FIG. 13 is a block diagram illustrating a configuration for cascaded distribution of the reset signals of a plurality of power supply control target units.

The power supply control target unit 101 illustrated in FIG. 13 includes a plurality of registers hierarchically distributed in cascade to propagate a reset signal. In the configuration illustrated in FIG. 13, a propagation circuit 2101 is arranged in a transmission path of the reset signal to stabilize distributed reset signals when the reset signal is distributed among the plurality of registers inside the power supply control target unit 101. The power supply control target unit 101 of FIG. 13 is connected to registers and the like to be reset after the cascaded distribution through three-stage registers. According to this configuration, after the reset starts, the registers to be reset are reset at the fourth cycle. Specifically, in the power supply control target unit 101 that includes registers of k-stage (multiple-stage) cascaded distribution including the registers to be reset (in FIG. 13 k-1 stages are illustrated), the initialization operation can be realized by transmitting to the power supply control target unit 101 a clock signal CLK_G having rising edges in the number corresponding to the stages of the registers (k rising edges) during the initialization operation.

Figure 14:
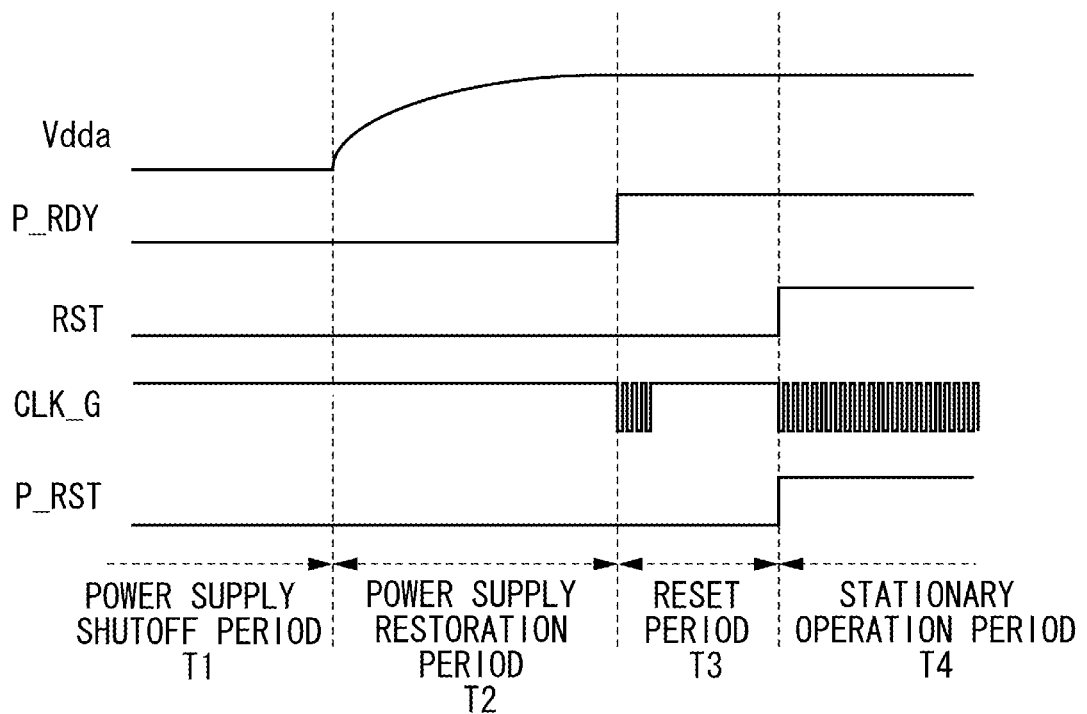
FIG. 14 is a timing chart where a minimum clock signal required for an initialization operation including cascaded distribution of the reset signals of power supply control target units is generated even in a state where the external reset signal is input.

FIG. 14 illustrates a timing chart of various signals when a power supply is to be restored in the configuration illustrated in FIG. 13.

In FIG. 14, a clock signal CLK_G having four rising edges is transmitted at the beginning of the reset period T3. Such an operation can be realized by setting in a reset cycle number setting unit 601 within the reset operation setting unit 105.

Although the description is given using the configuration that uses an external reset signal illustrated in FIGS. 11A and 11B, the present exemplary embodiment can also be realized with the configuration that uses an external clock enable signal illustrated in FIG. 8.

As described thus far, with the present exemplary embodiment, when cascaded distribution is provided in the power supply control target unit 101, a clock for the initialization operation is supplied efficiently to correspond to the cascaded distribution, and thus power consumption during the initialization operation can be further reduced.

Subsequently, a configuration extended to include a configuration to frequency-divide a clock to be supplied to the power supply control target unit 101 during the initialization operation will be described.

Figure 15A:
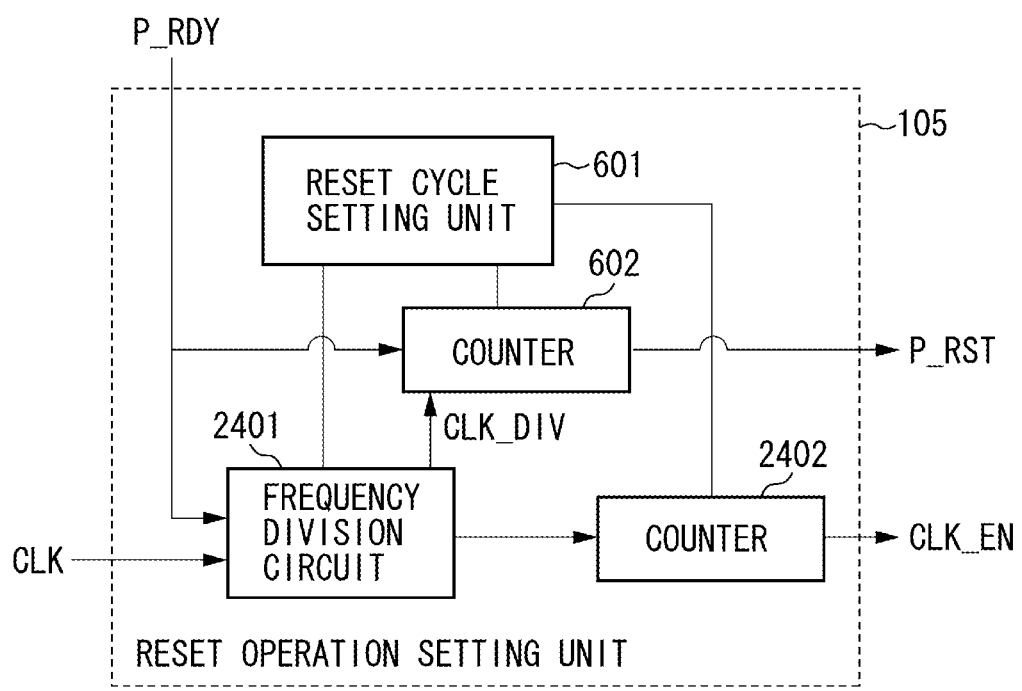
FIG. 15A is a block diagram illustrating a configuration of a reset operation setting unit including a frequency division circuit.

FIG. 15A illustrates a configuration of a reset operation setting unit 105 in which a clock frequency is reduced to lower an operation rate. With the configuration of FIG. 15A, a frequency division circuit 2401 of the reset operation setting unit 105 converts a clock signal CLK into low frequency. Then, the frequency division circuit 2401 transmits clock signals CLK_DIV whose edges match the converted clock signal CLK to the counter 602 and the counter 2402, individually. The counter 2402 generates a signal CLK_EN for generating an intermittent clock by thinning through clock gating a rising edge of the clock signal CLK_G input to the power supply control target unit 101.

Figure 15B:
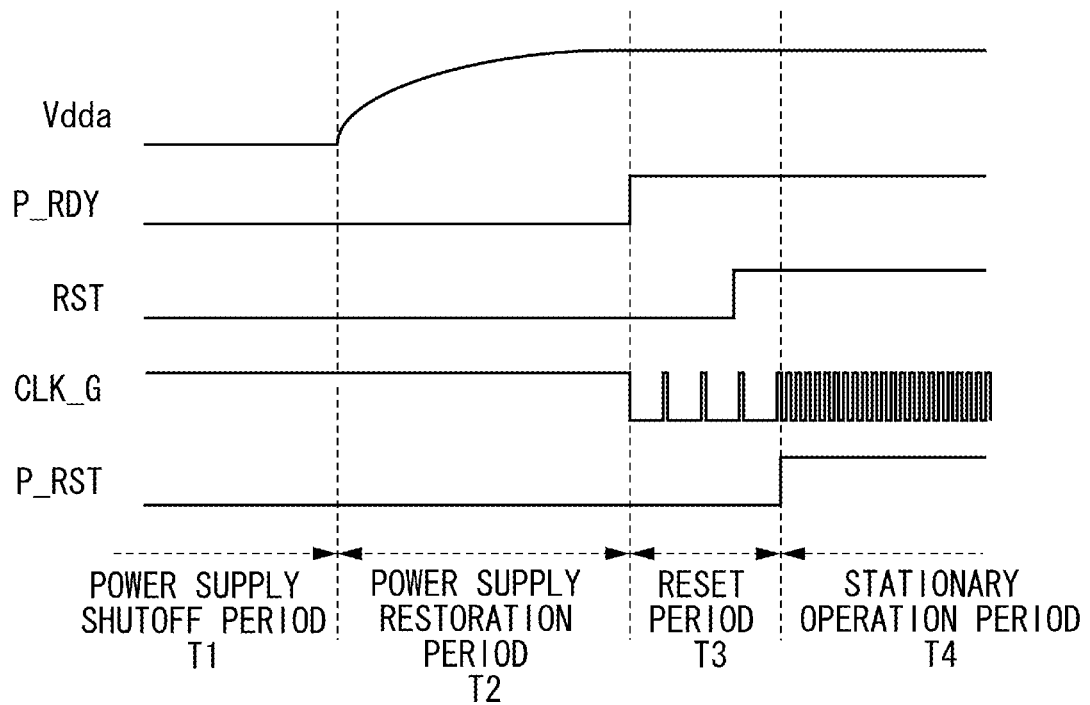
FIG. 15B is a timing chart where a clock within a reset is frequency-divided.

FIG. 15B illustrates a timing chart of various signals when the power supply to the power supply control target unit 101 is to be restored using the reset operation setting unit 105 of FIG. 15A. After the initialization operation through the clock signal CLK_G that is frequency-divided through the thinning operation by the counter 2402 (reset period T3), a transition is made into the stationary operation period T4.

As described thus far, by frequency-dividing a clock to be supplied to the power supply control target unit 101 during the initialization operation, power consumption during the initialization operation can be further reduced.

Thus far, the descriptions have been given using the plurality of drawings, but the present invention can be implemented by combining the configuration of each drawing as well. Further, although the descriptions have been given above using the semiconductor integrated circuit, the present invention can also be applied to an information processing apparatus that includes a hard-wired logic capable of clock gating.

Although only a case where the plurality of power domains is arranged in parallel has been illustrated in the exemplary embodiments described above, the configuration illustrated in FIG. 5 may further be provided within one of the power domains to form the plurality of power domains in hierarchical structure. If the number of power domains increases, managing the power domains integrally may become difficult. In such a case, power domains set for general functional groups are controlled in upstream hierarchies, and power domains for detailed functions are controlled in downstream hierarchies, which allows the power domains to be dispersively controlled.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-129885 filed Jun. 7, 2012, which is hereby incorporated by reference herein in its entirety.

What is claimed is:

1. A semiconductor integrated circuit, comprising:
a power supply control target unit, wherein a power supply supplied thereto is to be controlled;
a power supply control unit configured to control the power supply supplied to the power supply control target unit;
a detection unit configured to detect that a voltage of the power supply supplied to the power supply control target unit by the power supply control unit has reached a specified voltage for operating the power supply control target unit;
an instruction unit configured to output an instruction to operate the power supply control unit to the power supply control unit, wherein the detection unit starts measuring a voltage of the power supply supplied to the power supply control target unit in accordance with an instruction output from the instruction unit; and an initialization unit configured to control initialization so that a clock supply to initialize the power supply control target unit starts based on a detection of the detection unit, the initialization unit including:
- a holding unit configured to hold a value indicating an initialization period;
- a reset unit configured to continue issuing a reset signal to the power supply control target unit during the period indicated by the holding unit since a start of the clock supply;
- an issuance unit configured to issue an enable signal so that the clock supply starts; and
- a gating unit configured to cancel gating of a clock transmitted to the power supply control target unit based on the enable signal.

2. The semiconductor integrated circuit according to claim 1, wherein the detection unit includes a time counting unit to count only for a preliminary set period until the voltage of the power supply reaches the specified voltage.

3. The semiconductor integrated circuit according to claim 1, further comprising a frequency division unit configured to frequency-divide a clock supplied to the power supply control target unit in accordance with a detection of the detection unit.

4. The semiconductor integrated circuit according to claim 1, wherein the initialization unit includes a delay unit configured to delay an enable signal to start a clock supply to the power supply control target unit and a reset signal to the power supply control target unit.

5. The semiconductor integrated circuit according to claim 1, wherein the initialization unit includes a synchronization unit configured to synchronize an enable signal to start a clock supply to the power supply control target unit with a reset signal to the power supply control target unit.

6. The semiconductor integrated circuit according to claim 1, wherein the power supply control unit includes a switch.

7. The semiconductor integrated circuit according to claim 1, wherein the gating unit is a gating clock buffer.

8. A semiconductor integrated circuit, comprising:
a power supply control target unit, wherein a power supply supplied thereto is to be controlled;
a power supply control unit configured to control the power supply supplied to the power supply control target unit;
a detection unit configured to detect that a voltage of the power supply supplied to the power supply control target unit by the power supply control unit has reached a specified voltage for operating the power supply control target unit; and
an initialization unit configured to control so that a clock supply to the power supply control target unit starts based on a detection of the detection unit,
wherein the detection unit includes a measuring unit configured to measure a voltage of the power supply supplied to the power supply control target unit, a time counting unit configured to count only for a preliminary set period until the voltage of the power supply reaches the specified voltage, and a selection unit configured to select an output of one of the measuring unit and the timing unit.

9. A semiconductor integrated circuit, comprising:
a power supply control target unit, wherein a power supply supplied thereto is to be controlled;
a power supply control unit configured to control the power supply supplied to the power supply control target unit;
a detection unit configured to detect that a voltage of the power supply supplied to the power supply control target unit by the power supply control unit has reached a specified voltage for operating the power supply control target unit; and
an initialization unit configured to control so that a clock supply to the power supply control target unit starts based on a detection of the detection unit,
wherein the power supply control target unit includes a plurality of stages of registers for cascaded distribution of a reset signal, and
wherein the initialization unit controls to supply a clock having rising edges in the number corresponding to the number of the stages of the registers to the power supply control target unit.

* * * * *